United States Patent
Georgiev (10) Patent No.: US 10,448,242 B2
(45) Date of Patent: Oct. 15, 2019

(54) METHOD AND ARRANGEMENT FOR ON-BOARDING NETWORK SERVICE DESCRIPTIONS FROM VARIOUS SOURCES IN A COMMON SERVICE CATALOGUE OF NFV ORCHESTRATION PLATFORM

(71) Applicant: Comptel Oy, Helsinki (FI)

(72) Inventor: Zhivko Georgiev, Helsinki (FI)

(73) Assignee: Comptel Oy, Helsinki (FI)

( * ) Notice: Subject to any disclaimer, the term of this patent is extended or adjusted under 35 U.S.C. 154(b) by 104 days.

(21) Appl. No.: 15/857,936

(22) Filed: Dec. 29, 2017

(65) Prior Publication Data

US 2019/0208404 A1   Jul. 4, 2019

(51) Int. Cl.
  *H04W 4/00* (2018.01)
  *H04W 8/18* (2009.01)
  *H04L 29/08* (2006.01)

(52) U.S. Cl.
  CPC ............ *H04W 8/183* (2013.01); *H04L 67/16* (2013.01)

(58) Field of Classification Search
  CPC combination set(s) only.
  See application file for complete search history.

(56) References Cited

U.S. PATENT DOCUMENTS

2017/0012823 A1* 1/2017 Zhu ..................... H04W 28/08
2019/0052579 A1* 2/2019 Senarath ............. H04L 41/0806

OTHER PUBLICATIONS

European Telecommunications Standards Institute: ETSI GS NFV-MAN 001, Network Functions Virtualisation; Management and Orchestration, V1.1.1 (Dec. 2014).

* cited by examiner

Primary Examiner — Omoniyi Obayanju (57) ABSTRACT

Electronic arrangement (120) for on-boarding services in a common service catalog (106, 406) from a number of source systems (502, 503, 521, 522) of 3rd party service providers in connection with a network function virtualization (NFV) platform in a telecommunication network (110) comprising a mobile network, the arrangement comprising at least one data interface (124) for transferring data, at least one processing unit (122) for processing instructions and other data, and memory (128) for storing the instructions and other data, said at least one processing unit being configured, in accordance with the stored instructions, to cause: creating, in said memory, a service catalog (406) of network services offered by the NFV platform, wherein each cataloged network service is associated with a service description indicative of related transactions that are executable thereon, and responsive to obtaining a network service description (402) from an external source via the data interface, adding at least an indication (408) of the obtained network service description in the catalog, wherein a mapping (410) between a number of original transaction identifiers as provided in the obtained network service description and corresponding harmonized transaction identifiers as being internally commonly adopted and utilized by the platform having regard to the cataloged network services, is established (404, 510) in accordance with a selected conversion logic executed by said at least one processing unit so as to enable management of a target network service incorporating the obtained, on-boarded network service based on the associated harmonized identifiers.

16 Claims, 4 Drawing Sheets

METHOD AND ARRANGEMENT FOR ON-BOARDING NETWORK SERVICE DESCRIPTIONS FROM VARIOUS SOURCES IN A COMMON SERVICE CATALOGUE OF NFV ORCHESTRATION PLATFORM

TECHNICAL FIELD OF THE INVENTION

The present invention generally pertains to mobile communication networks and networks connected therewith, as well as related control arrangements and methods. More specifically, however not exclusively, the invention concerns a method and arrangement for on-boarding service description data in a common catalog in connection with a network function virtualization (NFV) architecture.

BACKGROUND OF THE INVENTION

The concepts of software-defined networking (SDN) and NFV have gained severe interest during the past few years as they enable creating software-based networks that are more programmable, scalable, and affordable than traditional networks based on more or less specialized hardware. NFV is basically about virtualizing tasks previously done in hardware by translating various networking tasks as load balancing, routing, and intrusion detection and prevention into software executable in a cloud on virtual machines using commodity hardware, whereas SDN is, in turn, about translating the associated control plane for managing virtualized network functions (VNF) into software.

ETSI (European Telecommunications Standards Institute) has established standards for designing and implementing NFV systems. For example, ETSI GS NFV-MAN 001 NFV; Management and Orchestration, V1.1.1 (2014-12), incorporated herein by reference in its entirety, describes the management and orchestration framework required for the provisioning of VNFs and related operations.

In traditional networks, network function (NF) implementations are usually tightly coupled with the infrastructure they run on, while NFV decouples software implementations of NF's from the computation, storage, and networking resources used for their realization. The virtualisation environment insulates the NFs from those resources through a virtualisation layer.

Figure 2:
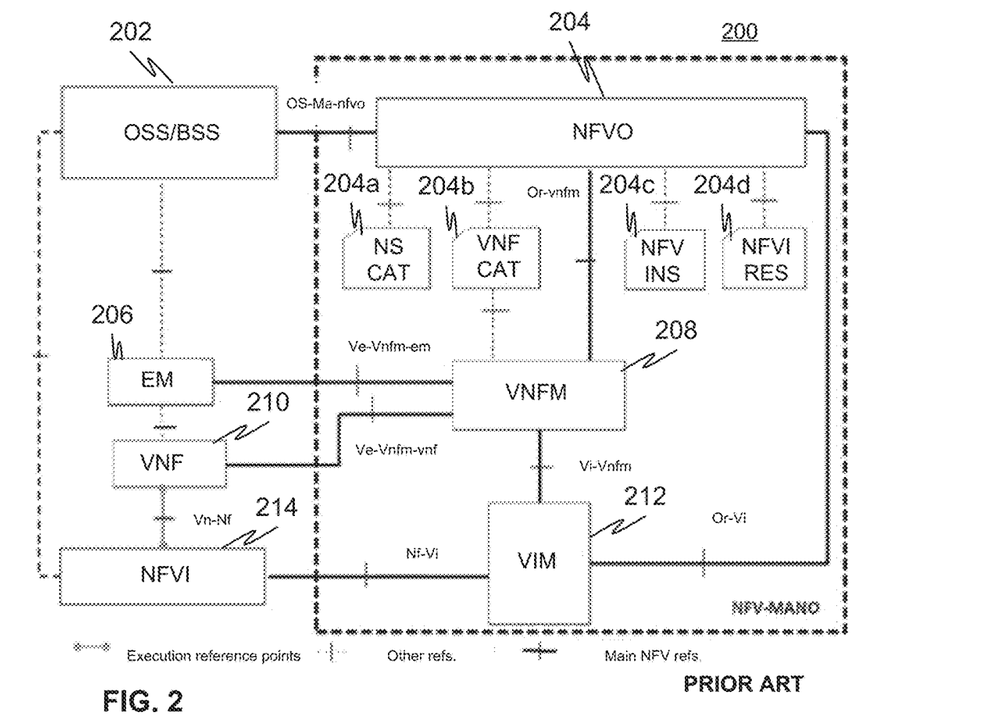
FIG. 2 depicts NFV-MANO architectural network.

FIG. 2 represents, at 200, Network Functions Virtualisation Management and Orchestration (NFV-MANO) architectural framework as defined by the ETSI for managing the resources of NFVI (NFV Infrastructure) and orchestrating their allocation as needed by various network services (NS) and VNFs 210 used to implement them. One or more VNFs and/or Physical Network Functions (PNFs) may be connected to realize an NS. The framework includes computing, networking, storage, and virtual machine (VM) resources. The VNF Manager (VNFM) 208 manages the life cycles of VNFs. In addition, the NFV Orchestrator (NFVO) 204 manages the life cycles of network services utilizing the VNFs.

In more detail, VIM (Virtualized Infrastructure Manager) 212 takes care of managing NFVI resources in its target domain (there may be many in the overall NFV architecture) by creating, maintaining and deleting virtual machines (VM) from available physical resources, creating and maintaining virtual links, virtual networks, sub-nets, and ports to support the management of VNFFGs (VNF Forwarding Graph, chaining VNFs to establish desired end-to-end services), maintaining software images for VNFs 210, collecting performance and fault data, and managing catalogs of virtualized resources, resource configurations (e.g. virtual CPU configurations, types of network connectivity, etc.) or templates, for example.

NFVI 214 encompasses the actual hardware (e.g. compute, storage, and networking) and software (e.g. hypervisors) components that together provide the infrastructure resources where VNFs 210 are ultimately deployed for execution. The NFVI 214 may also include partially virtualised NFs. Examples of such partially virtualised network functions are related to "white box" switches, hardware load balancers, DSL Access Multiplexers (DSLAMs), Broadband Remote Access Server (BRAS), Wi-Fi access points, CPEs, etc., for which a certain part of the functionality is virtualised and may thus be in the scope of NFV-MANO 200 while other parts can be built in silicon (PNF, physical network function) due to e.g. physical constraints (e.g. digital interfaces to analogue physical channels) or vendor design choices.

Element Management (EM) 206 is responsible for the FCAPS (Fault, Configuration, Accounting, Performance and Security management) for a VNF 210. The EM 206 may collaborate with a VNF Manager (VNFM) 208 to perform those functions that require exchange of information regarding the NFVI resources associated with the VNF 210.

The VNFM 208 manages the life cycle of VNFs 210 by setting them up, maintaining and ultimately terminating them. It 208 also takes care of FCAPs of VNFs for the virtual part. Yet, it 208 may scale VNFs up or down. A single VNFM 208 may manage multiple VNFs or just one. For example, when a VNF is to be instantiated (or scaled), the VNFM consults a corresponding VNF Descriptor (VNFD), to perform the following:

allocate and configure NFVI resources (compute, storage and network resources), load or install the software components of the VNF; for example, using a repository of software images provided in a corresponding VNF package, set up virtualized network connectivity between the VNF components and to other network elements, and connect the VNF to the operations support system (OSS) layer and manage and monitor it during its lifetime.

OSS/BSS 202 refers to the combination of the operator's other operations and e.g. business support functions that are not otherwise explicitly captured in the shown architectural framework 200, but are expected to have information exchanges therewith. OSS/BSS functions 202 may provide management and orchestration of legacy systems and may have full end to end visibility of services provided by legacy network functions in an operator's network.

NFV Orchestrator (NFVO) 204 handles the automatic management of network services' life cycle and of global NFV Infrastructure resources potentially across multiple data centers. The NFVO 204 may connect, or chain together, different functions to create end-to-end services in the NFV environment. In addition, the NFV Orchestrator manages NFV infrastructures e.g. among multiple VIMs 212 and coordinates resource requests. In practice, the NFVO 204 generates, maintains and deletes network services of one or more VNFs through communication with VNFM 208 and VIM 212. An end-to-end service of multiple VNFs from one or more vendors may be thereby created by communicating with the respective VNFMs 208.

The NFVO 204 on-boards various descriptors. For example, so-called NSDs, VNFFGDs, and VLDs, which are described in more detail hereinbelow, are "on-boarded" into the NS Catalog 204a, whereas VNFD is on-boarded in the VNF Catalog 204b as part of a VNF Package including also e.g. software images. Also PNFDs (physical network function descriptor) can be on-boarded.

Network Services (NS) Catalog 204a indeed refers to a repository of all on-boarded Network Services, enabling the creation and management of the NS deployment templates with reference to e.g. a Network Service Descriptor (NSD) including a plurality of information elements that enable the NFVO 204 to instantiate (deploy) the concerned NS formed by VNFFG(s), VNF(s), PNF(s), and/or VL(s). The information elements of the descriptor contain references other descriptors, which describe components that are part of that NS, including e.g. VNFFGD(s), VNFD(s), possible PNFD(s) and VLD(s) utilized by the NS.

A VNFFGD (VNFG Forwarding Graph Descriptor) is a deployment template which describes a topology (VNFFG) of the NS, or a portion of the NS, by referencing VNFs and PNFs and Virtual Links that connect them, i.e. it defines a service chain of VNFs to determine the service. VNFs contain connection points by which VNFs may be connected together by establishing virtual links (VL) therebetween. The VNFFG defined by the VNFFG contains a Network Forwarding Path (NFP) element that defines a sequence of actions that are to be performed, for example, by a collection of VNFs, to provide the requested service.

A Virtual Link Descriptor (VLD) describes in more detail e.g. the resource requirements that are needed for a link between VNFs, PNFs and endpoints of the NS, which could be met by various link options that are available in the NFVI).

On-boarding of an NS thus incorporates registering the NS, based on the obtained service specification data, in the catalog 204a. For example, instantiation of an NS is described by a related VNFFG, which defines the set of network functions that are required to execute the requested service.

A VNFD is a deployment template which describes a VNF in terms of its deployment and operational behaviour requirements. It is used e.g. by the VNFM in the process of VNF instantiation and life cycle management of a VNF instance. The information provided in the VNFD is also used by the NFVO 204 to manage and orchestrate Network Services and virtualised resources on the NFVI. The VNFD also contains connectivity, interface and KPIs requirement information. As mentioned above, the VNFD is on-boarded in VNF Catalog 204b, as part of a VNF Package.

VNF Catalog 204b represents the repository of (all) on-boarded VNFs in terms of VNF Packages, thus supporting the creation and management of the VNF Package (including e.g. VNF Descriptor (VNFD), software images, manifest files, etc.) via interface operations provided by the NFVO 204. Both NFVO 204 and VNFM 208 can query the VNF Catalog 204b for finding and retrieving a VNFD, to support different operations (e.g. validation or checking instantiation feasibility).

Figure 3:
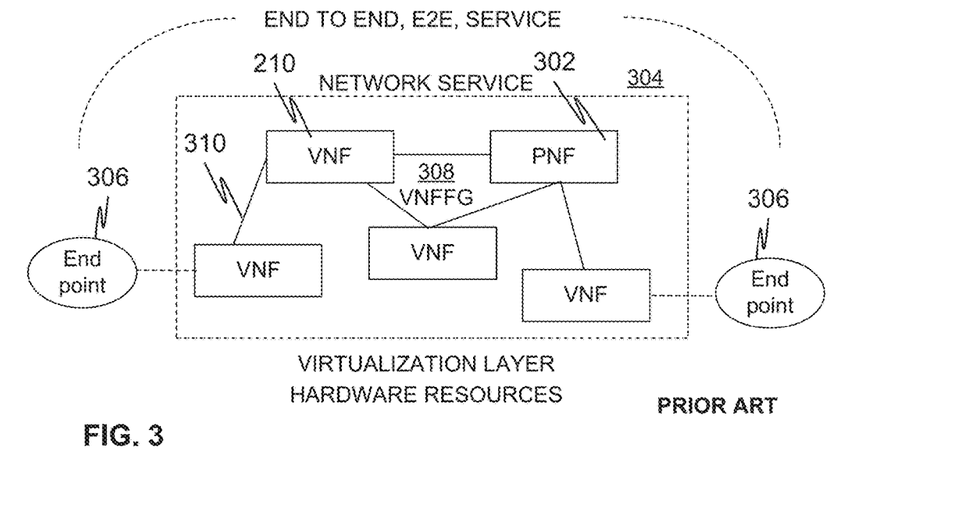
FIG. 3 illustrates one example of an end-to-end service incorporating at least one network service.

FIG. 3 illustrates the structure of one example of an end-to-end service incorporating at least one network service, NS 304, wherein the related VNFFG(s) 308 defined by corresponding VNFFGD(s) describe a topology of the NS or at least a portion of the NS, by referencing VNFs 210, possible PNFs 302 and Virtual Links 310 that connect them between the end points 306.

To construct a desired end-to-end, E2E, service, multiple Network Services can be combined with reference to combining e.g. mobile radio access network service with mobile core network service. For clarity reasons, only a single NS has been depicted in the figure but there could thus be several interconnected, even nested, network services in a common service chain to establish the desired E2E service.

Reverting to FIG. 2, NFV Instances repository 204c may hold information of all VNF instances and Network Service instances deployed (realized). Each VNF instance is represented by a VNF record, and each NS instance is represented by an NS record. Those records are updated during the lifecycle of the respective instances, reflecting changes resulting from execution of NS lifecycle management operations and/or VNF lifecycle management operations. This supports NFVO's and VNFM's responsibilities in maintaining the integrity and visibility of the NS instances, respectively VNF instances, and the relationship between them.

NFVI Resources repository 204d may hold information about available/reserved/allocated NFVI resources as abstracted by the VIM across operator's Infrastructure Domains, thus supporting information useful for resources reservation, allocation and monitoring purposes. As such, the NFVI Resources repository plays an important role in supporting NFVO's Resource Orchestration and governance role, by allowing NFVI reserved/allocated resources to be tracked against the NS and VNF instances associated with those resources (e.g. number of VMs used by a certain VNF instance at any time during its lifecycle).

Especially when provision of more complex network services or E2E-services, such as hybrid services employing services of legacy (traditional, non-virtualized) and virtualized nature, is to be supported by a selected MANO framework and e.g. orchestrator thereof, situations may easily occur where service specifications are to be imported and on-boarded in a catalog from various different sources.

In this context, with reference to e.g. NSDs, i.e. NS descriptors indicative of NS capabilities such as policies, resources needed, dependencies on other services, functions etc. as discussed hereinbefore, such NSDs or alternative service descriptions or specifications could be obtained from different sources, written in different formats and relying upon different standards adopting e.g. different naming conventions with reference to TOSCA (Topology and Orchestration Specification for Cloud Applications) and NETCONF/YANG (Network Configuration Protocol) based solutions, representing examples of mutually different standards utilized for setting up and configuring as well as for orchestrating virtual/physical networks.

As a practical example, when different service descriptions are obtained from multiple sources and on-boarded (registered) in a common catalog, they may follow mutually very different naming convention as to related transactions, i.e. behaviours of a catalog item (actions that can be performed with catalog items or parameters), such as life cycle events, or life cycle "operations".

E.g. in one source system a certain life cycle operation could be called 'DELETE' while in some other it was called 'REMOVE' or 'TERMINATE'. This versatility is problematic both from the standpoint of managing the catalog itself and controlling the actual deployment and generally life cycle of service instances of related services based thereon, not least having regard to constructing E2E services from the services or generally components provided by a plurality of different vendors (sources).

SUMMARY OF THE INVENTION

In the light of foregoing, one objective of the present invention is to at least alleviate the above problem, which can be attained by the provision of an NFV orchestration solution capable of constructing and offering network services flexibly based on source or component services provided by multiple vendors.

According to one aspect, an electronic arrangement, optionally comprising one or more servers, for on-boarding service description data in a common service catalog from multiple different external (source) systems of $3^{rd}$ party service providers in connection with a network function virtualization (NFV) platform in a telecommunication network comprising a mobile network, comprises at least one data interface for transferring data, at least one processing unit for processing instructions and other data, and memory for storing the instructions and other data, said at least one processing unit being configured, in accordance with the stored instructions, to cause:

creating, in said memory, a service catalog of network services offered by the platform, wherein each cataloged network service is associated with a service description indicative of related transactions, preferably including life cycle operations, that are executable thereon, and responsive to obtaining a network service description, including e.g. a so-called network service descriptor, from an external source, such as external system, network element or other component, via the data interface, adding at least an indication of the obtained network service description in the catalog (e.g. at least a portion of the obtained overall service description, such as NSD, provided with harmonized transaction identifiers instead of or in addition to the original ones, may be added, or a link thereto), wherein a mapping between a number of original transaction identifiers as provided in the obtained network service description and corresponding (matching) harmonized transaction identifiers as being internally commonly adopted and utilized by the platform having regard to the cataloged network services, is established in accordance with a selected conversion or translation logic executed by said at least one processing unit so as to enable management such as construction and/or deployment of a target network service, preferably end-to-end service, incorporating the obtained, on-boarded service based on the harmonized identifiers.

In various embodiments, service data including descriptions of various services is received from one or a plurality of different (mutually heterogeneous), external, e.g. third party vendor, systems and on-boarded in the catalog such that the originally different identification schemes or "naming conventions"—following transaction names are harmonized, or "normalized", as suggested herein to be mutually comparable and more easily combinable with other services and/or components, for instance, to create desired E2E and/or hybrid services.

In various embodiments, the suggested mapping activities to enable data standardization and unification, may be extended to any parameter or generally information element, such as (virtualized) function names, of the received network service description e.g. in cases where the concerned service is to be deployed in and/or by the arrangement itself or a third system instead of the source. In such cases, the mapping may be, or it may be utilized as, unidirectional (external system->arrangement). Indeed, if the on-boarded service is to be deployed by the arrangement itself under its own domain, or by a further party/system whereto the arrangement provides the necessary data, also e.g. related VNF packages or associated data, such as descriptors (VNFD), related software images, and/or manifest files, may be imported e.g. from the same or different source, added to e.g. VNF catalog, and forwarded/indicated to necessary entities such as VNFM of the deploying domain. Alternatively, at least part of the data to deploy and generally execute the service, such as selected VNFs may already be available at the arrangement or at a further deploying system, whereupon the related data such as function descriptions or their software images do not have to be imported anymore.

However, in various embodiments, the network service may be at least partially deployed by the external source system that has provided the service description for on-boarding in the present catalog in the first place, or by a further system optionally connected thereto. E.g. in such cases, wherein the deploying party understands and uses the original description, the arrangement may be configured to utilize the mapping bi-directionally. For example, upon instantiating the service (i.e. actual creation of the service using the associated on-boarding artefacts such as various service descriptions) or during later execution and management thereof, a call to execute a related transaction, may be converted, based on the available mapping, by the arrangement, from the harmonized form back to the original format internally utilized by the external system and indicated thereto so as to enable the external system to properly identify the transaction and act accordingly, e.g. to deploy the service.

In various embodiments, the arrangement is configured to on-board network service descriptions following mutually different identification schemes (naming conventions and/or notations) from one or multiple external systems. The arrangement may be further configured to combine at least one of such services with one other of such services and/or with a further service, such as non-virtualized network service, to construct e.g. an E2E service. To control the operation or e.g. life cycle of the constructed service, the arrangement may be configured to signal to the concerned external system(s), which provided the network service descriptions allocated to the constructed service, about a need to perform a related operation, such as deployment of the service and e.g. related underlying VNF's, or service termination.

Based on the foregoing, in some embodiments the arrangement is thereby configured to receive the network service description for on-boarding in the catalog from an external source such as an external orchestrator system. Yet, the arrangement is configured to at least partially control the management of the service such as deployment (instantiation), scaling and/or termination thereof, which may occur locally, i.e. in the domain controlled by the arrangement, incorporating at least part of an NFV, such as specifically the MANO, architecture with an orchestrator or E2E orchestrator itself, or via external $3^{rd}$ party vendor systems, such as the source system(s) of the original service description(s), or various further entities/orchestrator(s) operatively connected to the arrangement. The arrangement may define or be comprised in a main or high(er) level orchestrator system that utilizes other orchestrators, e.g. core and access network orchestrators, or other orchestrators with different domain responsibilities, for instantiating and otherwise managing the created (E2E) services. The arrangement may optionally be further configured to transmit additional service data such as VNF packages/descriptions to the target system for utilization during deployment and generally life cycle of the service to deploy the VNF(s) as required by the service, for instance.

In various embodiments, the arrangement, potentially defining an end-to-end orchestration system or at least portion thereof, comprises a data interface and/or UI (user interface) through which the cataloged items including network services may be accessed or inspected preferably with the mapped, harmonized transaction identifiers and optionally also with the original transaction identifiers. Optionally, in the concerned UI, illustration of mapped and/or original identifiers may be adjustable such as selectable, preferably user selectable, via appropriate software features.

In various embodiments, the arrangement may be configured to utilize, in order to create the mapping and/or a revised service description such as NSD with harmonized transaction identifiers, at least one element selected from the group consisting of: machine learning, pattern recognition, supervised and/or unsupervised learning, analytics, semantic analysis, parsing, history data, and conversion (mapping) table.

In various embodiments, the catalog comprises the service descriptions, including e.g. so-called service descriptors (NSDs) in the language of the ETSI MANO documentation mentioned hereinbefore, of the cataloged network services. The service descriptions may in turn refer to other descriptions such as VNF descriptions (or specifically descriptors, e.g. VNFDs), which may be external to the actual service catalog.

After receiving a network service description from an external system and subsequent to harmonization of service data, preferably at least transaction identifiers, indicated therein, a revised, harmonized network service description may be included in the catalog. The mapping itself and/or the original service description (in a form prior to harmonization) may be stored in the catalog as well or external thereto.

In various embodiments, the arrangement is, in addition to creating the catalog and including new service descriptions therein through on-boarding, also configured to otherwise maintain the catalog, including e.g. deletion of service data or updating the data responsive to corresponding requests.

In various embodiments, the arrangement may be configured to besides deploying or controlling/triggering the deployment of network services, optionally E2E services, also execute or participate in other service management tasks such as scaling or termination thereof.

In various embodiments, the arrangement may be configured to publish the (technical) service catalog and/or service descriptions as described herein e.g. via the data interface and/or the UI. For example, a selected notification mechanism may be utilized for the purpose. The catalog and/or included services may be published northbound to a BSS, OSS, commercial catalog and/or cloud platform, where they can be configured, quoted and priced (i.e. translated into commercial services), for example.

In various embodiments, the arrangement may be configured to map and on-board service descriptions from external, domain-specific orchestration systems or platforms following e.g. TOSCA or NETCONF/YANG format.

In another aspect of the present invention, there is provided a method to be performed by an electronic arrangement, such as one or more servers, for on-boarding service descriptions in a common service catalog e.g. from a heterogeneous group of source systems of 3rd party service providers in connection with a network function virtualization (NFV) platform that the arrangement may establish, belong to or at least connect with. The arrangement or at least the platform may comprise a preferably E2E orchestrator of telecommunication services including e.g. mobile services. The method comprises:

constructing a digital service catalog of network services offered by the platform, wherein each cataloged network service is associated with a service description indicative of related transactions, and responsive to obtaining a network service description from an external source, adding an indication of the obtained network service description in the catalog, wherein a mapping between a number of original transaction identifiers as provided in the obtained network service description, with reference to e.g. life cycle operation identifiers, and corresponding harmonized (matching) transaction identifiers as being internally commonly adopted and utilized by the platform having regard to the cataloged network services, is established in accordance with a selected conversion or translation logic so as to enable management, including controlling the deployment, of a target network service, preferably end-to-end service, incorporating the obtained, on-boarded service based on the harmonized identifiers.

The utility of the present invention arises from multiple factors depending on each particular embodiment thereof.

The present invention yields a dynamic, substantially real-time operable mapping engine that executes a conversion logic, which enables on-boarding and maintaining a unified, common catalog of various network services originating from multiple different source systems relying upon mutually different identification schemes, or "naming conventions", of element identifiers, such as transaction identifiers, or vernacularly, transaction names. Accordingly, the solution enables intelligent and versatile determination and subsequent management of E2E services or other service combinations involving services from e.g. traditional (non-virtualized) OSS platform and NFV platform resulting in hybrid services, and/or services from different NFV platforms and orchestrator domains, thus considerably adding to the interoperability between and across the concerned systems, for example. Indeed, harmonization of service data such as transaction identifiers by the arrangement ensures that e.g. multiple services or specifically NSD's will be able to communicate using common language thus enhancing their interoperability, which enables flexibly mixing them in complex brand new services via the arrangement.

To produce the necessary mappings, various intelligent and adaptive analysis methods and logics, both automated and/or user-assisted, may be exploited to duly interpret and translate the identifiers of the transactions of the received service descriptions where the source of each imported network service description may vary with reference to some particular domain-specific orchestration platform, traditional OSS catalog, VIM catalog, VNFM, etc.

The mappings are preferably bi-directional, i.e. the mappings can be reversely applied as well while sending out e.g. a deployment instruction to an external system, including e.g. 3rd party orchestrator, for externally instantiating the concerned service from the standpoint of the present arrangement.

Indication of the mapped transaction identifiers e.g. via an applicable UI such as graphical UI, GUI, enables easier design of target services, such as E2E or cross-vendor orchestration services combining several network services from different sources together, due to their harmonized nature.

The present invention may be validly implemented in or in connection with a great variety of communication networks. Only one example of such a network may be a mobile communication network such as Long Term Evolution (LTE) network. Further examples of applicable network technologies are provided hereinlater.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, may be best understood from the following description of specific, still merely exemplary, embodiments when read in connection with the accompanying drawings.

Finally, numerous considerations provided herein concerning different embodiments of the arrangement may be flexibly applied to the embodiments of the method, mutatis mutandis and vice versa, as being appreciated by a skilled person.

The expression "a number of" refers herein to any positive integer starting from one (1), e.g. one, two, or three.

The expression "a plurality of" refers herein to any positive integer starting from two (2), e.g. two, three, four.

BRIEF DESCRIPTION OF THE DRAWINGS

Next the invention will be described in greater detail with reference to exemplary embodiments in accordance with the accompanying drawings, in which.

DETAILED DESCRIPTION

Different embodiments of the present invention may be utilized in a variety of network architectures and technologies, which include e.g. mobile networks of so-called 3G, 4G or 5G type, incorporating NFV (network function virtualization) based networks and/or hybrid networks incorporating features from both traditional (proprietary) mobile networks and NFV architecture.

To provide a more specific example, the suggested, at least partly virtualized, network solution may be implemented in connection with LTE (Long Term Evolution) network, i.e. a network scheme recommended by the 3rd Generation Partnership Project (3GPP), where the communications are, instead of more traditional circuit-switched connections, carried over an IP channel from user equipment (UE), via OFDM-based (Orthogonal Frequency Division Multiplexing) E-UTRAN (Evolved UMTS Terrestrial Radio Access Network) air interface, to an all-IP core, the Evolved Packet Core (EPC).

The EPC is a multi-access core network that basically enables operators to provide a common packet core network for 3GPP radio access (LTE, 3G, and 2G), non-3GPP radio access (HRPD, WLAN, and WiMAX), as well as fixed access (Ethernet, DSL, cable, and fiber). Different interworking specifications have been issued by the 3GPP for the purpose.

The EPC thus provides gateway access to other networks, operator services, applications, the Internet, etc. while ensuring an acceptable Quality of Experience (QoE) and charging a subscriber for their particular network activity. Even though LTE is in many contexts referenced as 4G technology, the basic LTE does not as such completely fulfill the requirements originally set for 4G wireless service by ITU-R, whereupon it is often considered to fall under the "almost" 4G or "first generation 4G" category, whereas a more recent enhancement thereof named as LTE Advanced meets the requirements more literally.

With reference to a scenario 100 of FIG. 1, a merely exemplary network environment is illustrated in connection of which an embodiment of the present invention could be implemented.

User devices (UE) 104*a*, 104*b*, 104*c* of users (subscribers) 102*a*, 102*b* and 104*c*, respectively, may refer to wired or wireless terminals, e.g. smartphones, tablets, wearable electronics devices, laptops or desktop computers, which may be functionally connected to a communications network 110 by a suitable wireless transceiver, for example, to access desired communication services offered by the network 110 such as voice calls 105*a*, internet (web/WWW) access 105*b* and/or various messaging services or applications 105*c*.

The mobile network 110 may comprise one or more core networks 112A, such as the EPC in connection with the LTE type network architecture. The UE's 104*a*, 104*b*, 104*c* may connect to the core network 112A via at least one radio access network (RAN) 112B. In the specific example of LTE, the access network(s) 112B may comprise eNodeB type base stations.

IP network or generally PDN (packet data network) may be utilized to connect different parts such as LTE and 3G sub-networks of the overall network architecture considered together.

Through the network environment and associated equipment such as gateways, the UE's 104*a*, 104*b*, 104*c* and various network elements may further have access to other networks, e.g. the internet, and/or a number of external systems such as external networks and related entities, such as orchestration platforms, various external catalogs, and/or OSS/BSS system(s) of service provider(s).

In preferred embodiments, a number of virtualization technologies such as NFV (network function virtualization) and generally cloud architecture have indeed been applied to virtualize at least some of the functionalities provided by the network 110 as contemplated hereinbefore. Yet, in some embodiments, SDN (software defined network) may have been applied to separate data and control planes thereof.

Therefore, the network 110 shall preferably comprise, in addition to or instead of proprietary equipment implementing different network elements and related functionalities, various NFV management, orchestration (MANO) and implementation related entities such as general-purpose, commodity servers to host virtualized network functions (VNF) 111 on top of hypervisor-created virtual machines in accordance with the framework as shown e.g. in FIG. 2, to establish required network services in congruence with the afore-discussed sketch of FIG. 3, for example.

Hardware for realizing network elements and associated functionalities are indicated as item 118 in the figure notwithstanding their nature (proprietary vs commodity/NFV), while item 120 refers to the particular arrangement of the present invention, which may be or incorporate e.g. NFV Orchestrator or specifically NFV E2E orchestrator, or be at least connected therewith, and optionally further elements of the MANO architecture, for example. The arrangement 120 may thus contain one or more devices, such as optionally commodity type servers, at least operatively connected together and running software tailored for executing the solution of the present invention. Particularly in the case of several connected devices, the arrangement 120 may be logically called as a system. Yet, the arrangement 120 preferably contains or is at least functionally connected to a number of catalogs 106 including a network service catalog managed by the arrangement 120 as disclosed herein.

The arrangement 120 may contain at least one processing unit 122 such as a microprocessor, microcontroller and/or a digital signal processor. The processing unit 122 may be configured to execute instructions embodied in a form of computer software 126 stored in a memory 128, which may refer to one or more memory chips, for example, separate or integral with the processing unit 122 and/or other elements. The memory 128 may store various further data in addition to mere program instructions. It may, for example, host the aforementioned data repository called as a catalog.

The software 126 may define one or more computer programs for executing the activities described herein. A computer program product comprising the associated software code means may be provided. It may be embodied in a non-transitory carrier medium such as a memory card, an optical disc or a USB (Universal Serial Bus) stick, for example. The software could also be transferred as a signal or combination of signals wiredly or wirelessly from a transmitting element to a receiving element.

Item 124 refers to one or more data interfaces such as wired network and/or wireless network interfaces, or in practice network adapters, for providing communication capability to the arrangement 120 to exchange data with external systems and elements such as network elements. An UI (user interface) such as a web-based UI or other remote UI may be provided and optionally at least partially implemented by means of the interface 124.

Figure 1:
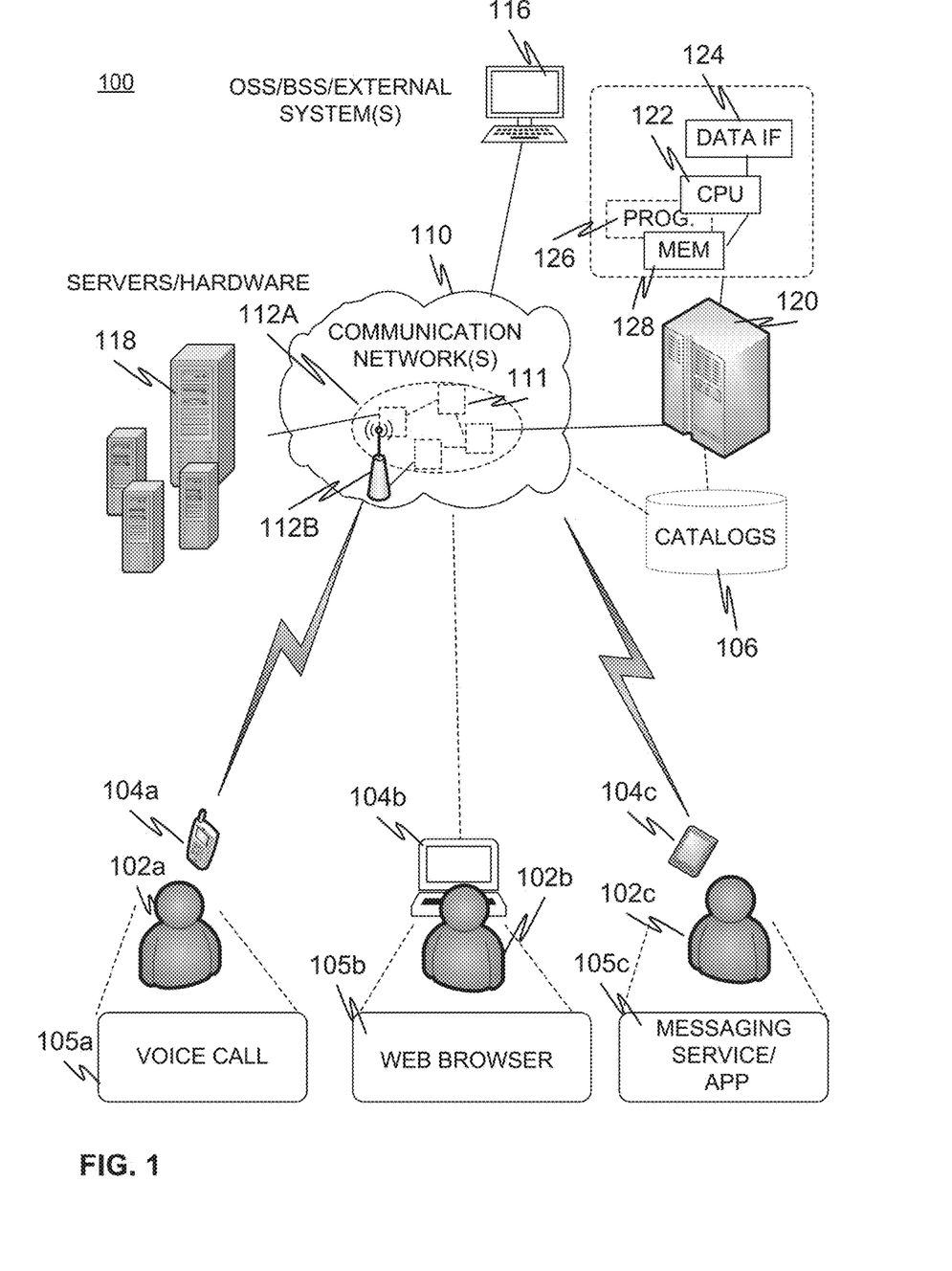
FIG. 1 illustrates one example of a network environment wherein various embodiments of the present invention may be implemented or utilized.

A plurality of further elements not specifically illustrated in FIG. 1 may naturally also be comprised in the network 110, with reference to e.g. various policy control, traffic analysis and/or charging functionalities—offering components, as being easily understood by a person skilled in the art.

Figure 4:
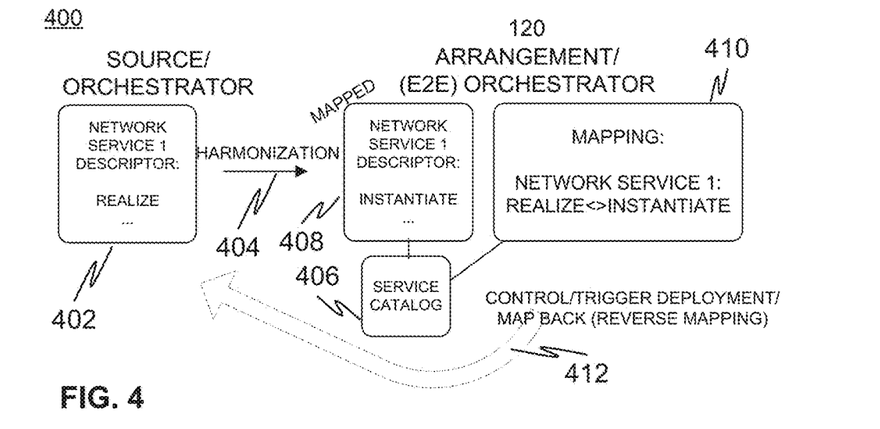
FIG. 4 illustrates selected basic concepts underlying various embodiments of the present invention as to on-boarding of network service descriptions in a common catalog.

FIG. 4 illustrates, at 400, selected basic concepts underlying various embodiments of the present invention as to on-boarding of network service descriptions obtained from a number of various sources in a common network service catalog managed by the arrangement 120.

A source such as an external network (element) or particularly orchestrator, may store a service description 402, such as the NSD and/or other deployment templates for the service, which is to be on-boarded in the catalog. The description 402 is obtained by the arrangement 120. The source may transmit it or the arrangement 120 may fetch it, for example.

On-boarding may generally refer herein to registering a network service in the catalog, typically incorporating storing a related indication such as a deployment template (e.g. NSD) therein, and ensuring that the necessary related templates describing the NS are on-boarded (duly received and registered) as well. On-boarding procedures may, when necessary, further involve e.g. data validation and/or harmonization, or "normalization", as specifically suggested herein. Responsive to receipt of an actual service order, instantiation of the on-boarded service is then triggered.

Preferably, the network service catalog 406 includes all on-boarded network services (NS). As already briefly reviewed hereinbefore, deployment (instantiation) and operational behavior requirements of each service is captured in a deployment template, and stored during the NS on-boarding process in the catalog 406 for future selection for instantiation. Deployment templates such as the NSD (network service descriptor), VNFFGD and VLD may be included in the catalog 406 to describe the attributes and necessary requirements to realize the concerned service.

As the original service description 402 may employ a foreign format and define transactions, such as service life cycle events/operations (e.g. instantiate, configure, start, stop, or terminate in ETSI language) or transactions generally indicative of get, set, modify, and delete type activities, using identification, or naming, scheme that is different from the one adopted by the arrangement 120 and optionally also different from the one(s) originally adopted by other service descriptions obtained from additional sources, a harmonization procedure 404 is executed e.g. by an applicable mapping engine to harmonize, or "normalize", via mappings 410, the associated formats including e.g. transaction identifiers prior to or upon on-boarding the description in the service catalog 406. As outcome, the transaction identifiers and optionally further service data defined in the service description 402 are translated to follow a common format or particularly, identification scheme, as internally adopted and preferred by the arrangement 120. Examples of applicable harmonization procedures are provided in more detail hereinafter.

Accordingly, a new, revised service description 408, including e.g. NSD with harmonized transaction names (e.g. "realize"<->"instantiate"), may be created and imported in the catalog 406. Still, the original service description 402, including e.g. original NSD, and/or at least indication thereof (such as mapping data 410 enabling bi-directional conversion between original and converted data such as transaction identifiers/names) may be stored as well, either in the catalog 406 itself or external thereto.

In the light of the foregoing, the catalog 406 preferably further contains or at least refers to associated mapping data 410 that enables tracking of harmonization tasks' history incl. past mapping decisions (which may be subsequently utilized in following harmonization actions) and/or execution of a reverse mapping procedure, which may in turn be applied to duly instruct an external system/orchestrator, such as the source of original service description, to instantiate and manage 412 the service in accordance with instructions by the arrangement 120. The arrangement may be thus configured to revert to the original identification scheme in the instructions so that the receiving system could duly interpret the orchestration instructions and especially, correctly recognize the transactions. As management of network services may require or at least benefit from substantially real-time control, also the mapping may be created and/or utilized in real-time fashion "on the fly", when needed. However, in some embodiments the arrangement 120 could even receive a service description following a certain first data format or particularly, certain transaction identification scheme, convert it into a second, internal format/scheme of the arrangement 120, and further convert it to a third format/scheme utilized by external orchestrator (not being the source of the original service description, anyway).

Due to the suggested solution, a cross-domain or E2D orchestrator is capable of consuming and harmonizing service specifications from various 3rd party catalogs originally separately maintained by different systems or specifically orchestrators such as access network and core network orchestrators.

Figure 5:
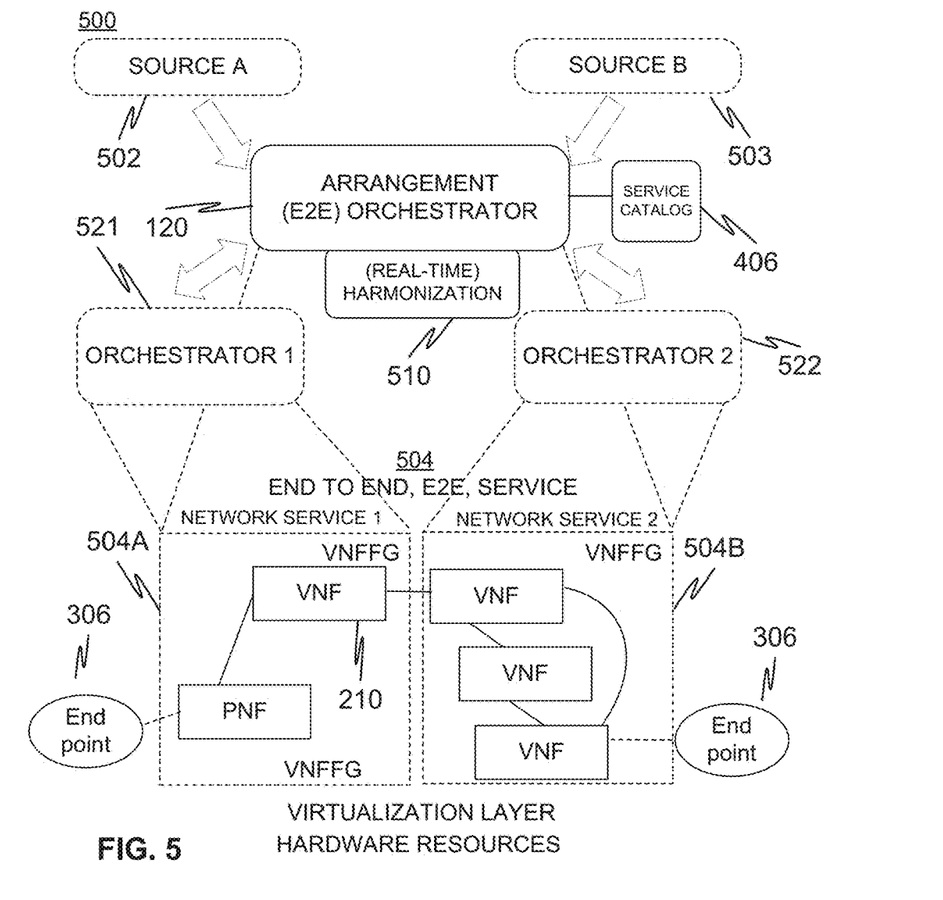
FIG. 5 illustrates an embodiment of an arrangement or system in accordance with the present invention with potential additional entities that are at least functionally connected therewith.

FIG. 5 illustrates, at 500, an embodiment of an arrangement, or system, in accordance with the present invention with potential additional, operatively connected entities.

The arrangement 120 may comprise e.g. an NFV orchestrator (NFVO) entity as discussed hereinbefore and maintain a network service catalog 406. The arrangement 120 may advantageously implement e.g. E2E or "multi-domain" orchestrator functionality.

In some embodiments, a number of network service descriptions to be harmonized 510 in accordance with an embodiment of the present invention may be obtained from a number of optionally $3^{rd}$ party sources 502, 503, including e.g. external orchestration platform, external (OSS) catalog, etc., These sources 502, 503 may not have to be or possibly cannot be utilized by the arrangement 120 for actually instantiating the associated services 504A, 504B to construct e.g. a desired E2E or other target service 504 as the component services 504A, 504B of the overall target service 504 may be intended to be deployed by the arrangement 120 itself under its own NFV orchestration domain (see the dotted lines drawn directly from the arrangement 120 to the services illustrating this) and/or by potential cooperative orchestrator(s) 521, 522 connected thereto. Optionally, further data such as packages of required NVFs may be obtained from the sources 502, 503 to be able to instantiate the services 504A, 504B. The service descriptions are on-boarded in the network service catalog 406 of the arrangement 120 and/or provided, optionally with further format conversion as mentioned above, to cooperative orchestrators 521, 522 for local on-boarding, when applicable. Yet, said optional further data such as VNFD's may be on-boarded and installed in target systems and related (VNF) catalogs.

As the sources 502, 503, may not have to be utilized by the arrangement 120 for actual service deployment, and may only submit the original service data to the arrangement 120, also the mapping determined for converting the service data such as transaction identifiers from the original format to the format utilized by the arrangement 120 may in these cases be unidirectional and utilized only once upon on-boarding.

Alternatively, or additionally, entities, which are intended to instantiate the network services 504A, 504B under at least partial control of the arrangement 120, could themselves also act as service description sources as contemplated hereinbefore. Such entities could include e.g. ($3^{rd}$ party) orchestrators 521, 522, being e.g. domain-specific. In this case, the executed harmonization procedure preferably produces a mapping that is bi-directional or can be applied bi-directionally as the reverse conversion of e.g. transaction identifiers may be necessary upon instructing the source entities such as the orchestrators 521, 522 to recognize the ordered transactions and thereby to properly instantiate or otherwise manage the concerned services 504A, 504B.

Figure 6:
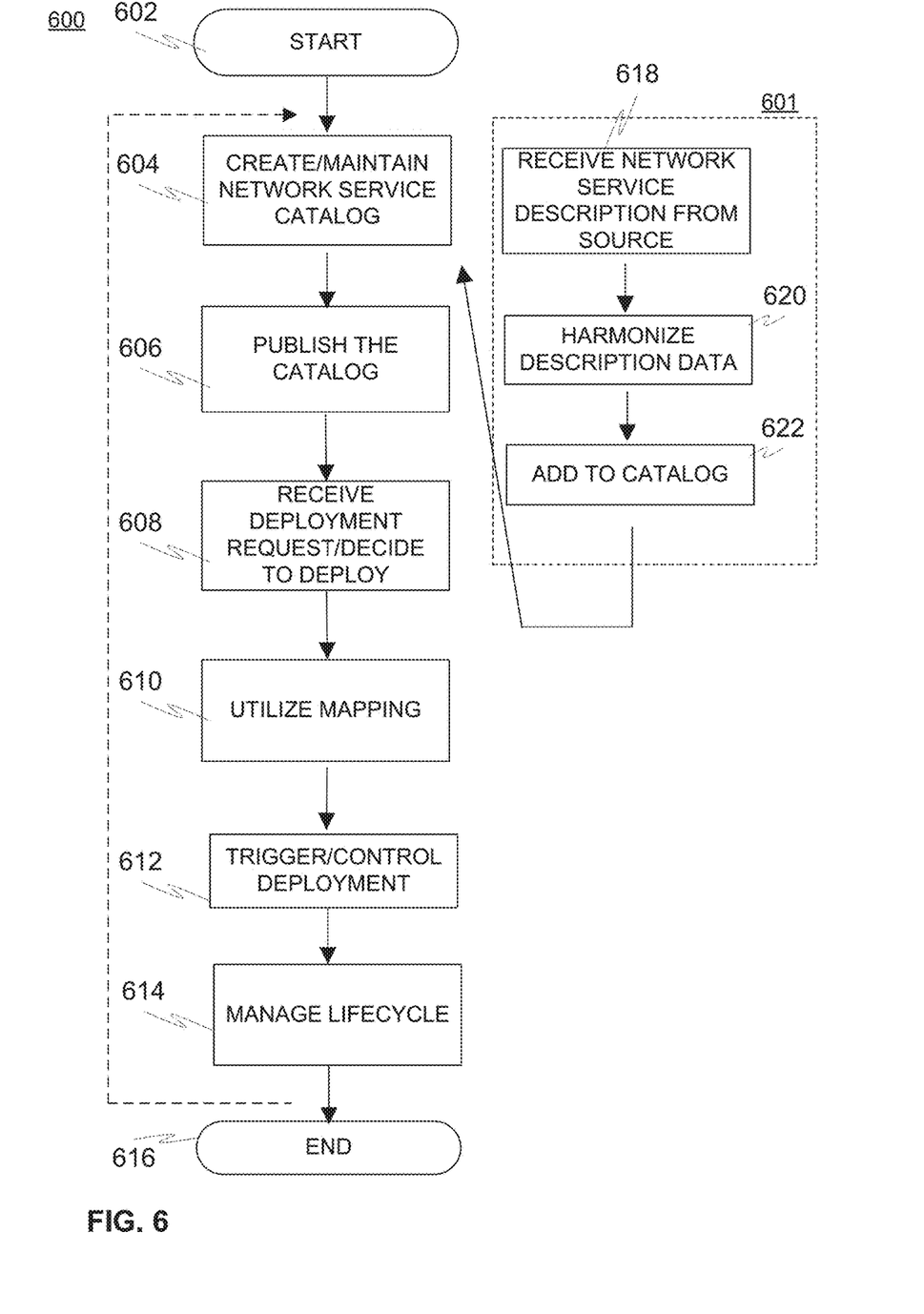
FIG. 6 is a flow diagram concerning an embodiment of a method in accordance with the invention.

FIG. 6 illustrates, at 600, items that may be performed in a method according to an embodiment of the invention. At start-up 602, different initial preparatory tasks may be executed. The executing arrangement 120 may be configured with the necessary hardware and software (with reference to a number of servers, for example) and provided in or at least connected to a target network.

At 604, a network service catalog is established with reference to one or more applicable data structures such as databases to hold service description data such as NSDs.

At 601, actions regarding acquisition, harmonization and on-boarding of one or more service descriptions are shown.

Item 618 refers to receipt of service description data, such as network service descriptor (NSD), from a data source for inclusion in a network service catalog.

In case the format of the service description regarding e.g. transaction identifiers such as life cycle event operation identifiers and/or other identifiers is not natively supported by the arrangement, a related, typically one-to-one, mapping is established by executing a conversion, or "translation", logic for the purpose during item 620. The arrangement may maintain a structure such as a list of harmonized (target) transaction identifiers to which the various heterogeneous original identifiers of received service descriptions should be selectively mapped based on the utilized mapping techniques and associated rules.

To derive a correspondence (link) between the original and a harmonized, unified transaction identifier, or "name", the arrangement may be configured to apply e.g. any one or more of the following procedures or elements, which may also mutually overlap, on the data:

mapping structure such as a conversion table exhibiting correspondence between identifiers of two or more identification schemes regarding the substantively same transactions;

parsing, which may further apply e.g. lexical analysis, syntactic analysis and/or semantic analysis to the service description based on selected analysis rules;

machine learning (e.g. tree learning, neural networks, clustering);

pattern recognition (automated and/or user-adjustable approach for transaction identifier and/or related pattern definition);

user-assisted, -controlled, -guided and/or -defined mapping (a user may e.g. via the UI define a number of standardized (harmonized) identifiers whereto the found identifiers are matched, and/or point out the matches directly);

comparison logic, wherein e.g. similarity (according to selected criterion having regard to e.g. position, length, common constituents such as letters, adjacent elements, etc.) of an identifier in the received service description with an identifier of the identification scheme adopted by the arrangement is tracked and if great enough similarity is found between the two identifiers according to the criterion, a match between them is registered, or alternatively, (relatively) best match type mapping is applied without stringent condition on minimum similarity to be met by two identifiers linked together via the mapping;

decision history (based on past decisions, which may be automated and/or user-assisted, similar decisions regarding matching of imported identifiers and harmonized versions may be made later, for example); and exclusion or leftover method (i.e. identifiers that have not been matched yet, can be assumed to correspond to each other with a higher likelihood than prior to finding any matches between any identifiers).

As a practical example of potential on-boarding activities, the following workflow is given that may be selectively adopted in various embodiments:

a user (operator of the arrangement, for example) decides to proceed with on-boarding of a new service description (e.g. NSD).

the user may then apply e.g. available (G)UI (graphical UI) to decide, via related input, if he/she desires to keep or change the transaction identifiers, or mapping therebetween, which has preferably been at least partially automatically determined by the analysis logic of the arrangement based on optionally user-adjustable matching/analysis rules. Via the UI one may preferably obtain visual representation of both original and harmonized (suggested and/or e.g. generally available) identifiers.

optionally, e.g. a system administrator may be provided with a configuration tool to pre-define a harmonization pattern or rule associated with a transaction, which is going to be utilized and followed by default (or "always", thus being non-user selectable, which could guarantee that every ordinary user managing the arrangement will follow company standard set for harmonization, for example).

preferably responsive to affirmative type user input (indicative of e.g. that the adjusted/automatically determined mapping is fine) provided through activating an UI feature or performing other predefined action, a new service description (e.g. NSD) will be then generated and imported in a service catalog by the arrangement based on the harmonization rules/mapping determined. Preferably, the original service description will be still maintained (stored) as contemplated hereinelsewhere, while the harmonized version guarantees that within the arrangement various imported transaction identifiers follow a common identification scheme.

e.g. a parsing engine may be utilized preferably on the fly (substantially real-time/during on-boarding process), which will replace transaction identifiers found in the obtained original service description with the harmonized ones for establishing the new description. Yet, transaction validity (against e.g. predefined schema or other schema) may be automatically checked. For example, in the case of TOSCA to be used as standard, TOSCA schema definition file may be utilized to validate whether the on-boarded description/descriptor is compatible therewith.

once technically completed, the (G)UI may be configured to indicate also to the user that the on-boarding process has been finished. Multiple service descriptions/descriptors may be on-boarded optionally by a common procedure; afterwards related statistics such as their count or e.g. version changes may be indicated via the (G)UI.

the on-boarded, harmonized service description(s) may be used to rapidly generate new network services or modify existing ones by adding particular functions thereto, for example.

as a final remark, if for some reason the user or other entity desired to obtain a service descriptor of a new/modified NS defined using the harmonized or original transaction (identification) format of a component service description—the arrangement could be provided with a capability to export such. In day to day operations, it is likely that once the new NS is created it is indicated to a northbound system to be then exposed to the customers/subscribers, for example.

At 622, the service description, which may refer to the originally received description, or when applicable, a new, revised service description with updated service data such as harmonized transaction identifiers, is on-boarded in the catalog. In addition to adding/registering the data in the catalog, a number of additional tasks such as description data validation and/or service component validation (presence of necessary VNF's, for example) may be executed depending on the embodiment as discussed hereinbefore.

The following method items do not relate to actual construction of the network service catalog itself but provide instead an illustrative, hands-on example of its typical utilization in various use scenarios, still benefiting from the availability of (bi-directional) mapping and harmonized service data such as transaction identifiers.

At 606, the catalog is published at least with harmonized service data such as the transaction identifiers. The catalog may be published e.g. northbound to one or more entities or elements such as a BSS, OSS, commercial catalog and/or a cloud platform. The actual mechanism for publishing may be selected embodiment-specifically by a person skilled in the art and may follow e.g. publish-subscribe paradigm.

At 608, a request to instantiate a network service containing at least one on-boarded, harmonized (preferably at least in terms of transaction identifiers) network service is received, e.g. from a northbound system. Alternatively, a decision to instantiate a service may be internally generated. The harmonized service may be a component of a greater service to be deployed, e.g. a so-called E2E service, as discussed hereinbefore.

As various service descriptions included in the network service catalog have been mutually harmonized, or "normalized", in terms of e.g. related transaction identifiers, general design of modified or more complex services such as E2E services and/or hybrid services, involving combining or specifically chaining multiple network services, has indeed been greatly facilitated and interoperability between the (component) services enhanced.

Responsive to request, at 610 the mapping between service data of the original and harmonized service description may be utilized, depending on the embodiment as discussed hereinbefore, e.g. reversely to obtain an identifier of a transaction for service instantiation/deployment as used by the source system or by other deploying system/orchestrator that has adopted the format of the original service description (or alternative format that can still be found from an available mapping) instead of the commonly adopted harmonized format utilized by the arrangement.

At 612, deployment instructions to instantiate the service are transmitted to the source system or other destination(s) taking care of instantiation, which may be external and/or internal to the arrangement. Recalling the fact that in some embodiments the arrangement may itself orchestrate (under its own orchestration domain, for example) the instantiation of at least portion of the overall service, it may communicate with a number of elements of the virtualization infrastructure such as VNFM(s) and/or VIM(s) to deploy the service without intermediate orchestrators.

Item 614 refers to various other management actions such as life cycle operations targeted to the on-boarded and instantiated network service and triggered by the arrangement. Also in triggering these actions, (reverse) mapping may be utilized for duly indicating a correct transaction to the executing party instead of the harmonized transaction identifier.

The method execution is ended at 616.

The dotted loopback arrow depicts the potentially repetitive nature of the execution of various method items. The catalog may be updated and indications such as descriptors of various network services added thereto (with transaction identification data harmonization when applicable/necessary), removed therefrom, or their descriptions revised, for instance. Yet, the on-boarded network services may be selectively instantiated, scaled and/or terminated in a repeated fashion upon need.

The present invention has been explained above with reference to a number of embodiments, and several advantages of the invention have been demonstrated. It is clear that the invention is not only restricted to these embodiments, however, but comprises further embodiments within the spirit and scope of inventive thought and especially the following patent claims.

The features recited in dependent claims are mutually freely combinable unless otherwise explicitly stated or being clear to a person skilled in the art due to inherent incompatibility.

The invention claimed is:

1. A system for on-boarding services in a common service catalog from a number of different source systems of $3^{rd}$ party service providers in connection with a network function virtualization (NFV) platform in a telecommunication network comprising a mobile network, the system comprising at least one data interface for transferring data, at least one processing unit for processing instructions and other data, and memory for storing the instructions and other data, said at least one processing unit being configured, in accordance with the stored instructions, to cause:

creating, in said memory, a service catalog of network services offered by the NFV platform, wherein each cataloged network service is associated with a service description indicative of related transactions that are executable thereon, and responsive to obtaining a network service description from an external source via the data interface, adding at least an indication of the obtained network service description in the catalog, wherein a mapping between a number of original transaction identifiers as provided in the obtained network service description and corresponding harmonized transaction identifiers as being internally commonly adopted and utilized by the platform having regard to the cataloged network services, is established in accordance with a selected conversion logic executed by said at least one processing unit so as to enable management of a target network service, incorporating the obtained, on-boarded network service, based on the associated harmonized identifiers.

2. The system of claim 1, wherein the indication of the service description added in the service catalog comprises said corresponding harmonized transaction identifiers and/or said original transaction identifiers.

3. The system of claim 1, configured to manage the target service covering multiple connected network services on-boarded in the service catalog with harmonized transaction identifiers.

4. The system of claim 1, configured to publish the catalog with service descriptions including the associated, harmonized transaction identifiers preferably towards a northbound system.

5. The system of claim 1, wherein the on-boarded service description data comprises at least one element selected from the group consisting of: a network service descriptor (NSD), VNF Forwarding Graph Descriptor (VNFFGD), and Virtual Link Descriptor (VLD).

6. The system of claim 1, configured to determine said mapping and/or resulting adapted network service description included in the catalog with harmonized transaction identifiers based on the mapping, at least one element selected from the group consisting of: machine learning, pattern recognition, parsing, history data, user-assisted matching, user input, and mapping table.

7. The system of claim 1, wherein service transactions to be harmonized in terms of related identifiers to follow the internally adopted identification scheme of the arrangement include at least one transaction selected from the group consisting of: life cycle management operation, service instantiation, service configuration, service start, service stop, and service termination.

8. The system of claim 1, configured to transmit a deployment order message for instantiating the obtained, on-boarded service to a $3^{rd}$ party system, wherein the order message indicates the desired instantiation operation via the associated original, non-harmonized transaction identifier.

9. The system of claim 1, configured to transmit a transaction triggering message regarding the on-boarded service, wherein the transaction is indicated using the original, non-harmonized transaction identifier.

10. A method, to be performed by at least one server, for on-boarding service descriptions in a common service catalog in connection with a network function virtualization (NFV) platform, said method comprising:

constructing a digital service catalog of network services offered by the platform, wherein each cataloged network service is associated with a service description indicative of related transactions, and responsive to obtaining a network service description from an external source, adding at least an indication of the obtained network service description in the catalog, wherein said constructing or said adding is performed by said at least one server, wherein a mapping between a number of original transaction identifiers as provided in the obtained network service description and corresponding harmonized transaction identifiers as being internally commonly adopted and utilized by the platform having regard to the cataloged network services, is established in accordance with a selected conversion logic so as to enable management of a target network service incorporating the obtained, on-boarded service based on the harmonized identifiers.

11. The method of claim 10, wherein the target network service covers multiple connected, on-boarded network services whose transaction identifiers have been harmonized to enhance interoperability therebetween.

12. The method of claim 10, further comprising a computer software product, embodied in a non-transitory computer readable carrier medium, comprising instructions causing a computer to execute said method of claim 10.

13. The system of claim 1, wherein the target network service is an end-to-end and/or hybrid service.

14. The system of claim 3, wherein configured to manage the target service includes configured to determine, instantiate, re-configure, scale and/or terminate the target service.

15. The system of claim 8, wherein the $3^{rd}$ party system includes said external source.

16. The method of claim 10, wherein the NFV platform includes an end-to-end orchestrator of telecommunication services that includes mobile services.

* * * * *